United States Patent [19]

Harada et al.

[11] Patent Number: 4,960,581

[45] Date of Patent: Oct. 2, 1990

[54] METHOD FOR PREPARING GASEOUS METALLIC FLUORIDE

[75] Inventors: Isao Harada; Yukihiro Yoda, both of Yamaguchi; Naruyuki Iwanaga, Shimonoseki; Toshihiko Nishitsuji, Shimonoseki; Akio Kikkawa, Shimonoseki, all of Japan

[73] Assignee: Mitsui Toatsu Chemicals, Inc., Tokyo, Japan

[21] Appl. No.: 322,415

[22] Filed: Mar. 13, 1989

[30] Foreign Application Priority Data

Mar. 16, 1988 [JP] Japan ................................. 63-60271
Mar. 16, 1988 [JP] Japan ................................. 63-60272
Mar. 16, 1988 [JP] Japan ................................. 63-60273
Mar. 16, 1988 [JP] Japan ................................. 63-60274
Nov. 11, 1988 [JP] Japan ................................. 63-283749

[51] Int. Cl.$^5$ .............................................. C01B 9/08
[52] U.S. Cl. .................................... 423/489; 423/258; 423/293; 423/301; 423/343
[58] Field of Search ............... 423/489, 491, 492, 494, 423/495, 258, 263, 293, 301, 343

[56] References Cited

U.S. PATENT DOCUMENTS 2,904,398  9/1959  Smith .................................. 423/263
4,179,492  12/1979  Kruesi ................................ 423/263
4,704,261  11/1987  Petit .................................... 423/258

FOREIGN PATENT DOCUMENTS 1050315  7/1959  Fed. Rep. of Germany ...... 423/492
1123298  9/1959  Fed. Rep. of Germany ...... 423/343
3014694  2/1978  Japan ................................. 423/258
  60271  3/1988  Japan .
  60272  3/1988  Japan .
  60273  3/1988  Japan .
  60274  3/1988  Japan .
283749  11/1988  Japan .

*Primary Examiner*—Jeffrey E. Russel
*Assistant Examiner*—Brian M. Bolam
*Attorney, Agent, or Firm*—Fisher, Christen & Sabol

[57] ABSTRACT

The method for preparing a gaseous metallic floride is here disclosed which comprises reacting a metal or its oxide with a fluorine gas or nitrogen trifluoride gas, the aforesaid method being characterized by comprising the steps of mixing the metal or its oxide with a molding auxiliary comprising a solid metallic fluoride which does not react with fluorine and nitrogen trifluoride; molding the resulting mixture under pressure; and contacting the molded pieces with the fluorine gas or nitrogen trifluoride gas, while the molded pieces are heated.

18 Claims, No Drawings

METHOD FOR PREPARING GASEOUS METALLIC FLUORIDE

BACKGROUND OF THE INVENTION (i) Field of the Invention

The present invention relates to a method for preparing a gaseous metallic fluoride by reacting a metal or metallic oxide with a fluorine gas or nitrogen trifluoride gas.

(ii) Description of the Prior Art

A gaseous metallic fluoride of the present invention means a metallic fluoride which is in a gaseous state in the vicinity of a temperature at which a metal or metallic oxide is reacted with a fluorine gas or nitrogen trifluoride gas.

Typical examples of the gaseous metallic fluoride include compounds such as tungsten hexafluoride ($WF_6$), molybdenum hexafluoride ($MoF_6$), antimony pentafluoride ($SbF_5$), niobium pentafluoride ($NbF_5$), tantalum pentafluoride ($TaF_5$), titanium tetrafluoride ($TiF_4$), silicon tetrafluoride ($SiF_4$), germanium tetrafluoride ($GeF_4$) and arsenic trifluoride ($AsF_3$).

These compounds are utilizable in a variety of industrial fields. For example, $WF_6$, $MoF_6$ and the like are expected as raw materials of electrodes for semiconductors. In particular, tungsten silicide ($WSi_2$) and molybdenum silicide ($MoSi_2$) which can be prepared from $WF_6$ and $MoF_6$ as raw materials are noticed as wire materials for large scale integrated circuits (LSI). In addition, the above-mentioned gaseous metallic fluorides, inclusive of $WF_6$ and $MoF_6$, are used as various fluorinating agents and as optical materials.

Heretofore, the gaseous metallic fluoride has been generally prepared by a method which comprises contacting/reacting a metal or metallic oxide with a fluorine ($F_2$) gas or nitrogen trifluoride ($NF_3$) gas at a high temperature of some hundreds centigrade degrees. In this case, when the high-purity gas is desired, the metal is preferably used as the raw material. However, in usual cases, the metallic oxide is employed as the raw material because of being inexpensive and thus economical.

Since having strong toxicity and very high activity, the $F_2$ gas is diluted with an inert gas such as a nitrogen ($N_2$) gas or argon (Ar) gas so that the concentration of the $F_2$ gas may be in the range of about 10 to 30% by volume, when used in the above-mentioned contact reaction.

As described above, the $F_2$ gas is very toxic, and therefore it is advantageous to use $NF_3$ from the viewpoint of safety, though cost increases a little.

Hereinafter, the metal or metallic oxide will be called "metal or the like" inclusively.

In the above-mentioned reaction between the metal or the like and $F_2$ or $NF_3$, the produced gaseous metallic fluoride is led out of the reaction system and is then cooled at a temperature less than its boiling point in order to collect the product. Therefore, a carrier gas is necessary in the reaction. Since the carrier gas is introduced together with the $F_2$ gas or $NF_3$ gas into a reactor, an inert gas such as a nitrogen ($N_2$) gas, helium (He) gas or argon (Ar) gas is usually used as the carrier gas.

When the metal or the like is reacted with the $F_2$ gas or $NF_3$ gas (hereinafter referred to sometimes as "$F_2$ gas or the like"), the metal or the like is usually used in the form of powder so as to promptly and effectively perform the contact of the metal or the like with the $F_2$ gas or the like. This reaction is carried out by introducing the $F_2$ gas or $NF_3$ gas into the powder layer of the metallic oxide on a fluidized bed or fixed bed disposed in the reactor.

However, in such a method, there is the following problem.

That is, in the fluidized bed system, the diluted $F_2$ gas or the like passes through the layer of the metallic powder or the like being fluidized, and therefore the fine powder of the metal or the like is entrained in the produced gaseous metallic fluoride, with the result that the purity of the product deteriorates. Furthermore, the yield of the product is limited to about 80% or so based on the $F_2$ gas, and also in this point, the above-mentioned method is insufficient.

On the other hand, in the case of the fixed bed system, the reaction of the metallic powder or the like and the $F_2$ gas or the like is performed only on the surface of the layer of the metallic powder or the like, and thus the contact area of the metal powder or the like with the $F_2$ gas or the like is restricted, so that the yield is inconveniently low. In addition, there is also the problem that the produced gaseous metallic fluoride is contaminated with plenty of the unreacted $F_2$ gas or the like. Moreover, as the reaction makes progress, the metal powder or the like is more and more finely ground, and the finely ground metal powder is entrained in the produced gas, which leads to the deterioration in the product purity. In order to heighten the yield in the fixed bed system, it is necessary to increase the contact area of the metal powder or the like and the $F_2$ gas or the like, which requires the fairly enlarged reactor. In this reaction, however, the $F_2$ gas or $NF_3$ having extremely strong corrosion is used as the raw material, and for this reason, expensive nickel is usually used as the raw material of the reactor. Therefore, scaling up the reactor results in the noticeable increase of the cost disadvantageously.

SUMMARY OF THE INVENTION

An object of the present invention is to provide a method for preparing a gaseous metallic fluoride by which the contamination of the gaseous metallic fluoride with metal powder is prevented and by which the desired gaseous metallic fluoride can be manufactured in high yield and at low cost.

The present invention is directed to a method for preparing a gaseous metallic fluoride by reacting a metal or its oxide with a fluorine gas or nitrogen trifluoride gas, the aforesaid method being characterized by comprising the steps of selecting the metal (M) or its oxide; mixing the metal (M) or its oxide with a molding auxiliary comprising a solid metallic fluoride which does not react with fluorine and nitrogen trifluoride; molding the resulting mixture under pressure; and contacting the molded pieces with the fluorine gas or nitrogen trifluoride gas, while the molded pieces are heated.

The gaseous metallic fluoride is a compound represented by $MF_m$ wherein M is at least one simple metal selected from the group consisting of metals in the groups IIIA, IIIB, IVA, IVB, VA, VB, VIA and VIB of the periodic table, and m is an integer of 3 to 6. Typically, the gaseous metallic fluoride is at least one compound selected from the group consisting of tungsten hexafluoride ($WF_6$), molybdenum hexafluoride ($MoF_6$), antimony trifluoride ($SbF_3$), antimony pentafluoride ($SbF_5$), niobium pentafuoride ($NbF_5$), arsenic trifluoride ($AsF_3$), phosphorus trifluoride ($PF_3$), boron trifluoride ($BF_3$), tantalum pentafuoride ($TaF_5$), titanium tetrafluoride ($TiF_4$), silicon tetrafluoride ($SiF_4$), germanium tetrafluoride ($GeF_4$), sulfur hexafluoride ($SF_6$) and uranium hexafluoride ($UF_6$).

The solid metallic fluoride as the molding auxiliary which does not react with fluorine and nitrogen trifluoride is at least one compound selected from the group consisting of fluorides of metals in the groups IA, IIA and IIIB of the periodic table.

Typically, the solid metallic fluoride is at least one compound selected from the group consisting of lithium fluoride (LiF), sodium fluoride (NaF), potassium fluoride (KF), rubidium fluoride (RbF), cesium fluoride (CsF), beryllium fluoride ($BeF_2$), magnesium fluoride ($MgF_2$), calcium fluoride ($CaF_2$), strontium fluoride ($SrF_2$), barium fluoride ($BaF_2$), aluminum fluoride ($AlF_3$), gallium fluoride ($GaF_3$) indium fluoride ($InF_3$), thallium fluoride ($TlF_3$) and aluminum sodium fluoride ($Na_3AlF_6$).

The simple metal or its oxide which is the raw material is a simple metal or its oxide corresponding to the above-mentioned gaseous metallic fluoride.

The metal or its oxide which is the raw material is mixed with the molding auxiliary, the amount of the metal or its oxide being in the range of 30 to 70% by weight. Afterward, the mixture is molded in a shape of cylinder, ring or chrysanthemum having a typical diameter of about 5 to 15 mm under a pressure of 0.5 to 10 t/cm$^2$.

The reaction of the thus molded pieces with the fluorine gas or nitrogen trifluoride gas is carried out at a temperature of 150° to 700° C. under a pressure of 1 to 10 kg/cm$^2$ for a period of 1 to 20 hours. At this time, it is preferred that the molded pieces are disposed as a filler layer in a reactor and the fluorine gas or nitrogen trifluoride gas is caused to pass through this layer.

It is also preferred that prior to the reaction, the molded pieces are subjected to a heating treatment in a reducing gas atmosphere at a temperature of 500° to 850° C. for a period of 1 to 500 hours.

DETAILED DESCRIPTION OF THE INVENTION

A gaseous metallic fluoride which can be prepared in the present invention is a fluoride which can be synthesized by usually reacting fluorine or nitrogen trifluoride (hereinafter referred to simply as "fluorine or the like") with a metal or metallic oxide (hereinafter referred to simply as "metal or the like"), and the above-mentioned fluoride is in a gaseous state at a reaction temperature at which the simple metal or the like is reacted with the $F_2$ gas or the like, for example, at a temperature of 300° C. or more. Examples of such a fluoride compound include tungsten hexafluoride ($WF_6$), molybdenum hexafluoride ($MoF_6$), antimony pentafluoride ($SbF_5$), antimony trifluoride ($SbF_3$), niobium pentafluoride ($NbF_5$), tantalum pentafluoride ($TaF_5$), titanium tetrafluoride ($TiF_4$), silicon tetrafluoride ($SiF_4$), silicon hexafluoride ($SiF_6$), germanium tetrafluoride ($GeF_4$), arsenic trifluoride ($AsF_3$), uranium hexafluoride ($UF_6$), phosphorus trifluoride ($PF_3$), boron trifluoride ($BF_3$) and sulfur hexafluoride ($SF_6$).

Needless to say, the metal used in the present invention is a metal constituting the above-mentioned gaseous metallic fluoride.

This metal is selected from metals in the groups IIIA, IIIB, IVA, IVB, VA, VB, VIA and VIB of the periodic table, and preferable typical examples of the simple metal include tungsten (W), molybdenum (Mo), antimony (Sb), niobium (Nb), arsenic (As), phosphorus (P), boron (B), tantalum (Ta), titanium (Ti), silicon (Si), germanium (Ge), sulfur (S) and uranium (U).

The metallic oxide used in the present invention is the oxide of each metal mentioned above and can provide the gaseous metallic fluoride through the reaction with the $F_2$ gas or the like. Typical examples of the metallic oxide include tungsten oxide ($WO_3$), molybdenum oxide ($MoO_3$), uranium oxide (UO, $UO_2$ and $U_3O_8$), arsenic oxide ($As_2O_5$), antimony oxide ($Sb_2O_5$), niobium oxide ($Nb_2O_5$), tantalum oxide ($Ta_2O_5$), titanium oxide ($TiO_2$) and germanium oxide ($GeO_2$).

With regard to the raw material metal used in the present invention, its shape is not particularly limited, but it is preferably in a powdery state having a particle diameter of 1 to 50 μm, preferably 3 to 20 μm. This reason is as follows: In the present invention, it is necessary that the metal is mixed with a molding auxiliary and the resulting mixture is then molded under pressure to form molded pieces. In this case, in order to obtain the product in high yield, it is preferable that the metal and molding auxiliary in the molded pieces are mixed as uniformly as possible, and hence the metal is conveniently in the state of the powder. In addition, when the metal is in the state of the powder, the molding under pressure is also easy.

Next, reference will be made to the molding auxiliary.

In the present invention, a solid fluoride which does not react with the fluorine or the like is used as the molding auxiliary. This solid fluoride is preferably in the state of a solid even at a temperature at which the metal or the like reacts with the $F_2$ gas or the like. Typical examples of such a solid fluoride include metallic fluorides of the group IA such as lithium fluoride (LiF), sodium fluoride (NaF), potassium fluoride (KF), rubidium fluoride (RbF) and cesium fluoride (CsF); metallic fluorides of the group IIA such as beryllium fluoride ($BeF_2$), magnesium fluoride ($MgF_2$), calcium fluoride ($CaF_2$), strontium fluoride ($SrF_2$) and barium fluoride ($BaF_2$); metallic fluorides of the group IIIB such as aluminum fluoride ($AlF_3$), gallium fluoride ($GaF_3$), indium fluoride ($InF_3$) and thallium fluoride ($TlF_3$); and a double salt such as aluminum sodium fluoride ($Na_3AlF_6$). They may be used singly or in combination.

Since the solid metallic fluoride is mixed with the metal or the like and is then molded under pressure, it preferably takes a powdery state having a particle diameter of about 1 to 20 μm, as in the case of the metal or the like.

In the present invention, the metal is mixed with the solid metallic fluoride which is the molding auxiliary, and the resulting mixture is then molded under pressure. In this case, the amount of the metal or the like in the mixture is in the range of 30 to 70% by weight based on the total weight of both the metal and the molding auxiliary. When the content of the metal or the like is too high, the reactivity is improved, but the strength of the molded pieces deteriorates, so that the molded pieces tend to break into powder unpreferably. Inversely, when the metal content is too low, the reactivity drops, though the strength of the molded pieces is sufficient.

In the present invention, the mixture of the metal or the like and the solid metallic fluoride is preferably molded under pressure by the use of a tableting machine, and in this case, tableting pressure is in the range of about 0.5 to 10 t/cm², preferably about 1 to 3 t/cm². The molded pieces may take any shape, so long as the shape can be obtained by the use of the usual tableting machine, and preferable examples are shapes of cylinder, ring, cubic, sphere, gear wheel shape and ribed shape. Moreover, the size of the molded pieces is not particularly limited, either, and it depends upon the size of the reactor and the handling ease of the molded pieces themselves. In effect, the molded pieces can take any size, so long as they can be obtained by the use of the tableting machine. Preferebly, the molded pieces have an effective diameter of 1/5 to 1/20 of the diameter of the reactor. For example, in the case that the shape of the molded pieces is cylindrical, it is preferred that the diameter of the molded pieces is 1/5 to 1/20 of the diameter of the reactor and the height thereof is ½ of this diameter, i.e., about 1/10 to 1/40 of the diameter of the reactor. Therefore, when the diameter of the reactor is 10 cm, the diameter and height of the molded pieces are preferably in the range of 5 mm$\phi$ to 2 cm$\phi$ and in the range of 2.5 mmh to 1 cmh, respectively. Also with regard to the molded pieces having other shapes, these standards can be applied.

In the preferable molded pieces, the content of water is low, and therefore it is preferred that the metal and solid fluorine compound are dried to remove water therefrom prior to the molding.

Next, reference will be made to a method for preparing the gaseous metallic fluoride by the use of the thus prepared molded pieces and the $F_2$ gas or the like.

In the present invention, the material for the reactor, in which the metal or the like will be reacted with the $F_2$ gas or the like, is usually nickel in consideration of anticorrosion to the fluorine or the like. The shape of the reactor is not particularly limited, but a cylindrical shape is preferable from the viewpoint of the ease of manufacture. The convenient usage of the reactor is as follows: Under the reactor uprightly stood, a perforated plate is disposed, and the reactor is then filled with the above-mentioned molded pieces so that these pieces may be put on the perforated plate. Afterward, the $F_2$ gas or the like is introduced into the reactor through the perforated plate from its underside. In this case, heating of the reactor is easily carried out by disposing a heater or the like on the outer periphery of the cylindrical reactor.

In the present invention, the reactor is filled with the molded pieces comprising the metal or the like and the molding auxiliary, as described above. While the molded pieces are heated at a predetermined temperature, the $F_2$ gas or the like is introduced into the reactor from its underside, so that the metal in the molded pieces is reacted with the $F_2$ gas or the like, thereby preparing the desired gaseous metallic fluoride. Needless to say, a reaction temperature depends upon the kind of gaseous metallic fluoride and the kinds of raw materials. Usually, the reaction temperature is in the range of 150° to 700° C., preferably 200° to 600° C. Typically, the reaction temperatures for the kinds of gaseous metallic fluorides are as shown in Table 1.

TABLE 1

| Gaseous Metallic Fluoride | Reaction Temperature (°C.) |
|---|---|
| Tungsten hexafluoride (WF$_6$) | 250–500 |
| Molybdenum hexafluoride (MoF$_6$) | 250–500 |
| Antimony pentafluoride (SbF$_5$) | 300–500 |

TABLE 1-continued

| Gaseous Metallic Fluoride | Reaction Temperature (°C.) |
|---|---|
| Niobium pentafluoride (NbF$_5$) | 300–550 |
| Tantalum pentafluoride (TaF$_5$) | 300–550 |
| Titanium tetrafluoride (TiF$_4$) | 300–550 |
| Germanium tetrafluoride (GeF$_4$) | 250–500 |
| Arsenic trifluoride (AsF$_3$) | 250–500 |
| Uranium hexafluoride (UF$_6$) | 250–500 |
| Arsenic tetrafluoride (AsF$_5$) | 250–500 |

The $F_2$ gas introduced into the reactor, when having a high concentration, is toxic, and therefore it is preferred that the $F_2$ gas is diluted with an inert gas such as an $N_2$ gas or Ar gas so as to be used at a concentration of about 5 to 40% by volume.

In the case of the $NF_3$ gas, it may be directly used without dilution, but for the ease of handling, the $NF_3$ gas, when used, may be conveniently introduced thereinto together with a carrier gas of an inert gas such as $N_2$ or Ar. In this case, the $NF_3$ gas and carrier gas may be introduced into the reactor separately or in the form of a mixture thereof. The heating of the reactor is easily carried out by disposing a heater or the like on the outer periphery of the cylindrical reactor, as described above.

At the time of the reaction, the pressure is not particularly limited, and needless to say, reduced pressure is also acceptable, but usually the pressure is in the range of atmospheric pressure to about 10 kg/cm². A reaction time depends upon the above-mentioned temperature, but it is usually in the range of 1 to 20 hours, preferably about 2 to 10 hours. The gaseous metallic fluoride obtained through the reaction contains some of the inert gas used to dilute the $F_2$ gas or the like and the unreacted $F_2$ gas or the like, and therefore the fluoride is cooled below its liquefaction temperature to remove the inert gas and $F_2$ gas or the like therefrom.

In a preferable embodiment of the present invention, the molded pieces are previously heated in a reducing gas atmosphere and are then brought into contact with the fluorine gas or the like under heating. This procedure permits preventing a white solid, which would comprise high-boiling compounds, from adhering to or, in an awful case, clogging pipes, valves and the like attached to the reactor. Therefore, the above-mentioned embodiment enables the stable operation of the reactor for a long period of time.

Now, reference will be made to the heating treatment of the molded pieces in the reducing gas atmosphere.

While the reactor filled with the molded pieces is heated, the reducing gas is introduced into the reactor. As the reducing gas, a usual gas such as an $H_2$ gas, $NH_3$ gas or CO gas can be used. The reducing gas can be used at a concentration of 100%, but it is preferably diluted with an inert gas such as an $N_2$ gas or He gas in consideration of safety.

A heating temperature depends slightly upon the kind of metal, but is usually in the range of 500° to 850° C. When the heating temperature is less than 500° C., the formation of the white solid cannot be inhibited perfectly during the reaction with the $F_2$ gas or $NF_3$ gas which will be described hereinafter. Inversely, when it is in excess of 850° C., energy is only wasted and the reactor filled with the molded pieces must be made from a more expensive material, though the purpose of this invention can be achieved.

The heating time is in the range of 1 to 100 hours in the case that the metal is used, and it is in the range of about 2 to 500 hours in the case that the metallic oxide is used.

The completion of the heating operation can be considered to be at the point of time when the water content in the reducing gas at the outlet of the reactor drops to several ppm or less.

In the present invention, it is preferred that the water content in the molded pieces is low, but additional heating to remove water therefrom is not particularly necessary, since the water in the molded pieces is removed therefrom by the above-mentioned heating.

The molded pieces which have been heated in the reducing gas atmosphere in this manner are then brought into contact with the $F_2$ gas or $NF_3$ gas, thereby preparing the gaseous metallic fluoride. In this case, the molded pieces which have undergone the heating treatment are preferably handled not to be exposed to an oxidizing atmosphere such as air.

Consequently, it is preferred that the heating treatment of the molded pieces is carried out while they are placed in the reactor, and after the heating treatment, the molded pieces are brought into contact with the $F_2$ gas or $NF_3$ gas while still placed in the reactor.

EXAMPLES

Now, the present invention will be described in detail in reference to examples, but it should not be limited to these examples.

Example 1

Metallic tungsten powder (iron content=50 ppm) of 99.9% purity which had been previously dried at 120° C. for 2 hours in an $N_2$ gas atmosphere was mixed sufficiently with NaF powder (first class grade chemical) which had been previously dried in like manner, in a weight ratio of 1:1, and the resulting mixture was then tableted under a tableting pressure of 2 t/cm² by the use of a small-sized tableting machine to obtain cylinder-shaped pieces each having a diameter of 5 mm and a height of 5 mm. Compressive strength of the molded pieces was extremely high, 270 kg/cm² in terms of an average value.

Next, a vertical reactor made of nickel and having an inner diameter of 19 mm and a height of 600 mm was filled in the central portion thereof with the molded pieces. Afterward, an $N_2$ gas having atmospheric pressure was introduced into the reactor from its underside at a flow rate of 300 Nml/minute for about 2 hours, while the filler layer of the molded pieces was heated at about 100° C. After the stop of the introduction of the $N_2$ gas, an $F_2$ gas diluted with an $N_2$ gas and having a concentration of about 30% by volume and atmospheric pressure was introduced into the reactor from its underside at a flow rate of 300 Nml/minute for 3 hours, while the filler layer of the molded pieces was heated at a temperature of 380° to 400° C., whereby reaction was performed. A $WF_6$-containing gas generated in the reactor was led into a refrigerant trap cooled to a temperature of $-80°$ C., so that the gas was liquefied and collected therein. After the reaction, the trap was evacuated by a vacuum pump to remove the $N_2$ gas used to dilute the $F_2$ gas and the unreacted $F_2$ gas.

The yield amount of $WF_6$ was 69 g, and its yield ratio is high, 96% based on fluorine. In addition, the molded pieces in the reactor maintained the predetermined shape without breaking.

Since it was difficult to quantitatively analyze the content of the metal tungsten present in the collected $WF_6$, the content of iron (Fe) which was present in a relatively great amount as an impurity in tungsten was instead measured by high-frequency induction combination plasma (ICP) analysis. As a result, it was apparent that the content of iron was 0.05 ppm or less. This result indicates that metal tungsten which was the raw material was prevented substantially from flying about.

Examples 2 to 8

The same procedure as in Example 1 was repeated with the exception that tungsten as the metal was replaced with each metal shown in Table 2 and sodium fluoride as the molding auxiliary was also replaced with each solid metal fluoride shown in Table 2 in each amount shown in Table 2, in order to obtain molded pieces in each amount shown in Table 2 (prior to the molding, each metal and molding auxiliary were dried as in Example 1).

The same reactor as used in Example 1 was filled with the molded pieces in each amount shown in Table 2, and an $F_2$ gas was introduced thereinto under reaction conditions shown in Table 2. Afterward, following the same procedure as in Example 1, a variety of gaseous metallic fluorides were prepared.

In this case, conditions of drying the molded pieces prior to the introduction of the $F_2$ gas into the reactor were the very same as in Example 1.

Yield amounts, yield ratios and Fe contents of the thus obtained gaseous metallic fluoride products are set forth in Table 2. The yields in the respective examples were as high as in Example 1, and the metals did not fly about as in Example 1. Additionally, in all the examples, after the completion of the reaction, it was confirmed that the molded pieces did not break.

TABLE 2

|  | Example 2 | Example 3 | Example 4 | Example 5 | Example 6 | Example 7 | Example 8 |
|---|---|---|---|---|---|---|---|
| Metal |  |  |  |  |  |  |  |
| Kind | molyb. | molyb. | tungs. | niobium | silicon | tantal. | germa. |
| Purity (wt %) | 99.9 | 99.9 | 99.9 | 99.9 | 99.0 | 99.9 | 99.9 |
| Fe content (ppm) | 60 | 60 | 50 | 40 | 300 | 80 | 45 |
| Amount (g) | 50 | 50 | 75 | 75 | 50 | 50 | 50 |
| Molding Auxiliary |  |  |  |  |  |  |  |
| Kind | NaF | $CaF_2$ | $CaF_2$ | $BaF_2$ | $MgF_2$ | KF | $Na_3AlF_6$ |
| Quality | first | first | first | first | first | first | first |
| Amoumt (g) | 75 | 50 | 50 | 50 | 100 | 75 | 75 |
| Molded Pieces |  |  |  |  |  |  |  |
| Tableting pressure (t/cm²) | 2 | 2 | 3 | 3 | 3 | 3 | 2 |
| Compressive strength (kg/cm²) | 300 | 280 | 350 | 280 | 300 | 320 | 300 |
| Yield (g) | 125 | 100 | 125 | 125 | 100 | 125 | 125 |

TABLE 2-continued

| | Example 2 | Example 3 | Example 4 | Example 5 | Example 6 | Example 7 | Example 8 |
|---|---|---|---|---|---|---|---|
| Reaction Conditions | | | | | | | |
| $F_2$ Gas | | | | | | | |
| Gas for Dilution | $N_2$ | $N_2$ | $N_2$ | $N_2$ | $N_2$ | $N_2$ | $N_2$ |
| Conc. of $F_2$ (vol %) | 30 | 20 | 30 | 30 | 30 | 10 | 20 |
| Flow rate (Nml/min.) | 300 | 300 | 300 | 300 | 300 | 300 | 300 |
| Pressure | atm. | atm. | atm. | atm. | atm. | atm. | atm. |
| Molded pieces (g) | 100 | 100 | 100 | 100 | 100 | 100 | 100 |
| Reaction temp. (°C.) | 300 | 350 | 350 | 400 | 300 | 400 | 300 |
| Reaction time (h) | 4 | 6 | 3 | 6 | 7 | 6 | 6 |
| Cooling temp. (°C.) | −80 | −80 | −80 | 30 | −196 | 20 | −80 |
| Product | | | | | | | |
| Yield (g) | 62 | 65 | 68 | 99 | 82 | 47 | 65 |
| Yield (%) (to fluorine) | 92 | 96 | 95 | 91 | 94 | 89 | 91 |
| Fe Content (ppm) | 0.05 or less | 0.05 or less | 0.05 or less | 0.05 or less | 0.05 or less | 0.05 or less | 0.05 or less |

In the foregoing, "molyb.", "tungs.", "tantal.", "germa." and "first" mean molybdenum, tungsten, tantalum, germanium and first class grade chemical, respectively.
The above-mentioned "atm." means atmospheric pressure.

Comparative Example 1

In the bottom portion of a lateral reactor made from nickel and having a diameter of 38 mm and a length of 600 mm was placed 100 g of the same previously dried metallic tungsten powder as used in Example 1 as uniformly as possible, and the reactor was then heated up to about 100° C. Afterward, an $N_2$ gas was introduced into the reactor from the left end portion thereof at a flow rate of 300 Nml/minute for about 2 hours, followed by drying metallic tungsten.

After the stop of the introduction of the $N_2$ gas, an $F_2$ gas diluted with an $N_2$ gas was introduced into the reactor from the left end portion thereof under the same conditions as in Example 1, while the metallic tungsten layer was heated at a temperature of 380° to 400° C. as in Example 1, and a $WF_6$-containing gas generated in the reactor was cooled, thereby collecting $WF_6$.

The yield amount of $WF_6$ was 33 g, and its yield ratio was 46% based on fluorine, which values were so low that they did not reach even the half levels of the values in Example 1. In addition, the content of Fe in $WF_6$ was 0.9 ppm, which was indicative that the product was not a little contaminated with the metallic tungsten powder.

Example 9

Metallic tungsten powder (iron content=50 ppm) of 99.9% purity which had been previously dried at 120° C. for 2 hours in an $N_2$ gas atmosphere was mixed sufficiently with NaF powder (first class grade chemical) which had been previously dried in like manner, in a weight ratio of 1:1, and the resulting mixture was then tableted under a tableting pressure of 2 t/cm² by the use of a small-sized tableting machine to obtain cylinder-shaped pieces each having a diameter of 5 mm and a height of 5 mm. Compressive strength of the molded pieces was extremely high, 280 kg/cm² in terms of an average value.

Next, a vertical reactor made of nickel and having an inner diameter of 19 mm and a height of 600 mm was filled in the central portion thereof with the molded pieces. Afterward, an $N_2$ gas having atmospheric pressure was introduced into the reactor from its underside at a flow rate of 300 Nml/minute for about 2 hours, while the filler layer of the molded pieces was heated at about 100° C. The flow rate of the $N_2$ gas was then lowered to 100 Nml/minute, and while the filler layer of the molded pieces was heated at a temperature of 380° to 400° C., an $NF_3$ gas having atmospheric pressure was introduced into the reactor at a flow rate of 80 Nml/minute, whereby reaction was performed for 2 hours. A $WF_6$-containing gas generated in the reactor was led into a refrigerant trap cooled to a temperature of −80° C., and the gas was liquefied and collected therein. After the completion of the reaction, the trap was evacuated by a vacuum pump to remove the $N_2$ gas used as a carrier gas, a secondarily formed $N_2$ gas and the unreacted $NF_3$ gas.

The yield amount of $WF_6$ was 60 g, and its yield ratio was as high as 94% based on $WF_6$. In addition, the molded pieces in the reactor maintained the predetermined shape without breaking.

Since it was difficult to quantitatively analyze the content of the metal tungsten present in the collected $WF_6$, the content of iron (Fe) which was present in a relatively great amount as an impurity in tungsten was instead measured by high-frequency induction combination plasma (ICP) analysis. As a result, it was apparent that the content of iron was 0.05 ppm or less. This result indicates that metal tungsten which was the raw material was prevented from flying about.

Examples 10 to 16

The same procedure as in Example 9 was repeated with the exception that tungsten as the metal was replaced with each metal shown in Table 3 and sodium fluoride as the molding auxiliary was replaced with each solid metal fluoride shown in Table 3 in each amount shown in Table 3, in order to obtain molded pieces in each amount shown in Table 3 (prior to the molding, each metal and molding auxiliary were dried as in Example 1).

The same reactor as used in Example 9 was filled with the molded pieces in each amount shown in Table 3, and the molded pieces were dried under the same conditions as in Example 9. Afterward, an $NF_3$ gas and carrier gas were introduced thereinto under reaction conditions shown in Table 3, and following the same procedure as in Example 9, a variety of gaseous metallic fluorides were prepared.

In this case, conditions of drying the molded pieces prior to the introduction of the $NF_3$ gas into the reactor were the very same as in Example 9.

Yield amounts, yield ratios and Fe contents of the thus obtained gaseous metallic fluoride products are set forth in Table 3. The yields of the respective examples were as high as in Example 9, and the metals did not fly about as in Example 9. Additionally, in all the examples, after the completion of the reaction, it was confirmed that the molded pieces did not break.

TABLE 3

|  | Example 10 | Example 11 | Example 12 | Example 13 | Example 14 | Example 15 |
|---|---|---|---|---|---|---|
| Metal | | | | | | |
| Kind | molyb. | molyb. | tantal. | germa. | niobium | antimo. |
| Purity (wt %) | 99.9 | 99.9 | 99.9 | 99.9 | 99.9 | 99.9 |
| Fe content (ppm) | 60 | 60 | 50 | 40 | 35 | 40 |
| Amount (g) | 50 | 40 | 40 | 50 | 60 | 60 |
| Molding Auxiliary | | | | | | |
| Kind | $CaF_2$ | $BaF_2$ | $AlF_2$ | NaF | $Na_3AlF_6$ | KF |
| Quality | first | first | first | first | first | first |
| Amount (g) | 50 | 60 | 60 | 50 | 40 | 40 |
| Molded Pieces | | | | | | |
| Tableting pressure (t/cm$^2$) | 2 | 2 | 3 | 2 | 3 | 2 |
| Compressive strength (kg/cm$^2$) | 250 | 230 | 260 | 250 | 270 | 210 |
| Yield (g) | 100 | 100 | 105 | 100 | 100 | 100 |
| Reaction Conditions | | | | | | |
| Carrier Gas | | | | | | |
| Kind | $N_2$ | $N_2$ | $N_2$ | $N_2$ | $N_2$ | $N_2$ |
| Flow rate (Nml/min.) | 80 | 100 | 60 | 100 | 100 | 100 |
| Pressure | atm. | atm. | atm. | atm. | atm. | atm. |
| $NF_3$ Gas | | | | | | |
| Flow rate (Nml/min.) | 80 | 100 | 60 | 100 | 100 | 100 |
| Pressure | atm. | atm. | atm. | atm. | atm. | atm. |
| Molded pieces (g) | 100 | 100 | 100 | 100 | 100 | 100 |
| Reaction temp. (°C.) | 350 | 400 | 450 | 300 | 400 | 400 |
| Reaction time (h) | 4 | 2.5 | 2 | 3 | 3 | 2.5 |
| Cooling temp. (°C.) | −80 | −80 | 20 | −80 | 20 | 20 |
| Product | | | | | | |
| Yield (g) | 82 | 67 | 50 | 86 | 85 | 81 |
| Yield (%) (to fluorine) | 91 | 95 | 94 | 96 | 94 | 93 |
| Fe Content (ppm) | 0.05 or less | 0.05 or less | 0.05 or less | 0.05 or less | 0.05 or less | 0.05 or less |

In the foregoing, "molyb.", "tantal.", "germa.", "antimo." and "first" mean molybdenum, tantalum, germanium, antimony and first classgrade chemical, respectively.
The above-mentioned "atm." means atmospheric pressure.

Comparative Example 2

In the bottom portion of a lateral reactor made of nickel and having a diameter of 25 mm and a length of 600 mm was placed 100 g of the same previously dried metallic tungsten powder as used in Example 9 as uniformly as possible, and the reactor was then heated up to about 100° C. Afterward, an $N_2$ gas having atmospheric pressure was introduced into the reactor from the left end portion thereof at a flow rate of 300 Nml/minute for about 2 hours, followed by drying metallic tungsten.

Afterward, the flow rate of the $N_2$ gas was lowered to 100 Nml/minute and an $NF_3$ gas having atmospheric pressure was introduced into the reactor from the left end portion thereof at a flow rate of 80 Nml/minute under the same conditions as in Example 9, while the metallic tungsten layer was heated at a temperature of 380° to 400° C. as in Example 9, whereby reaction was performed for 2 hours. Afterward, a $WF_6$-containing gas generated in the reactor was cooled to collect $WF_6$ in the same manner as in Example 9.

The yield amount of $WF_6$ was 28 g, and its yield ratio was 44% based on fluorine, which values were so low that they did not reach even the half levels of the values in Example 9. In addition, the content of Fe in $WF_6$ was 1.2 ppm, which was indicative that the product was not a little contaminated with the metallic tungsten powder.

Example 16

Tungsten oxide ($WO_3$) powder (iron content=55 ppm) of 99.9% purity which had been previously dried at 120° C. for 2 hours in an $N_2$ gas atmosphere was mixed sufficiently with NaF powder (first class grade chemical) which had been previously dried in like manner, in a weight ratio of 1:1, and the resulting mixture was then tableted under a tableting pressure of 2 t/cm$^2$ by the use of a small-sized tableting machine to obtain cylinder-shaped pieces each having a diameter of 5 mm and a height of 5 mm. Compressive strength of the molded pieces was extremely high, 260 kg/cm$^2$ in terms of an average value.

Next, a vertical reactor made of nickel and having an inner diameter of 19 mm and a height of 600 mm was filled in the central portion thereof with the molded pieces. Afterward, an $N_2$ gas having atmospheric pressure was introduced into the reactor from its underside at a flow rate of 300 Nml/minute for about 2 hours, while the filler layer of the molded pieces was heated at about 120° C. After the stop of the introduction of the $N_2$ gas, while the filler layer of the molded pieces was heated at a temperature of 380° to 400° C., an $F_2$ gas diluted with the $N_2$ gas and having a concentration of about 20% by volume and atmospheric pressure was introduced into the reactor from its underside at a flow rate of 300 Nml/minute for 3 hours, whereby reaction was performed. A $WF_6$-containing gas generated in the reactor was led into a refrigerant trap cooled to a temperature of $-80°$ C., and the gas was liquefied and collected therein. After the completion of the reaction, the trap was evacuated by a vacuum pump to remove the $N_2$ gas used to dilute the $F_2$ gas, the unreacted $F_2$ gas and a secondarily formed $O_2$ gas which slightly remained in the liquefied $WF_6$.

The yield amount of $WF_6$ was 45 g, and its yield ratio was as high as 94% based on fluorine. In addition, the molded pieces in the reactor maintained the predetermined shape without breaking.

Since it was difficult to quantitatively analyze the content of the metal tungsten present in the collected $WF_6$, the content of iron (Fe) which was present in a relatively great amount as an impurity in tungsten was instead measured by high-frequency induction combination plasma (ICP) analysis. As a result, it was apparent that the content of iron was 0.05 ppm or less. This result indicates that tungsten oxide which was the raw material was prevented substantially from flying about.

Examples 17 to 23

The same procedure as in Example 16 was repeated with the exception that tungsten oxide as the metallic oxide was replaced with each metallic oxide shown in Table 4 and sodium fluoride as the molding auxiliary was replaced with each solid metal fluoride shown in Table 4 in each amount shown in Table 4, in order to obtain molded pieces in each amount shown in Table 4 (prior to the molding, each metallic oxide and molding auxiliary were dried as in Example 16).

The same reactor as used in Example 16 was filled with the molded pieces in each amount shown in Table 4, and an $F_2$ gas was introduced thereinto under reaction conditions shown in Table 4, and following the same procedure as in Example 16, a variety of gaseous metallic fluorides were prepared.

In this case, conditions of drying the molded pieces prior to the introduction of the $F_2$ gas into the reactor were the very same as in Example 16.

Yield amounts, yield ratios and Fe contents of the thus obtained gaseous metallic fluoride products are set forth in Table 4. The yields of the respective examples were as high as in Example 16, and the metallic oxide did not fly about as in Example 16. Additionally, in all the examples, after the completion of the reaction, it was confirmed that the molded pieces did not break.

TABLE 4

|  | Example 17 | Example 18 | Example 19 | Example 20 | Example 21 | Example 22 |
|---|---|---|---|---|---|---|
| Metallic Oxide | | | | | | |
| Kind | $MoO_3$ | $Sb_2O_3$ | $Nb_2O_5$ | $Ta_2O_5$ | $TiO_2$ | $GeO_2$ |
| Purity (wt %) | 99.9 | 99.9 | 99.9 | 99.9 | 99.0 | 99.9 |
| Fe content (ppm) | 60 | 60 | 50 | 40 | 50 | 80 |
| Amount (g) | 50 | 60 | 50 | 60 | 40 | 40 |
| Molding Auxiliary | | | | | | |
| Kind | $BaF_2$ | $AlF_2$ | $CaF_2$ | $Na_3AlF_6$ | $MgF_2$ | $KF$ |
| Quality | first | first | first | first | first | first |
| Amount (g) | 50 | 40 | 50 | 40 | 60 | 60 |
| Molded Pieces | | | | | | |
| Tableting pressure (t/cm$^2$) | 2 | 2 | 3 | 3 | 3 | 3 |
| Compressive strength (kg/cm$^2$) | 200 | 260 | 350 | 280 | 300 | 320 |
| Yield (g) | 100 | 100 | 105 | 100 | 100 | 100 |
| Reaction Conditions | | | | | | |
| $F_2$ Gas | | | | | | |
| Kind of diluent gas | $N_2$ | $N_2$ | $N_2$ | $N_2$ | $N_2$ | $N_2$ |
| Conc. of $F_2$ (vol %) | 20 | 20 | 30 | 20 | 10 | 20 |
| Flow rate (Nml/min.) | 300 | 300 | 300 | 300 | 300 | 300 |
| Pressure | atm. | atm. | atm. | atm. | atm. | atm. |
| Molded pieces (g) | 100 | 100 | 100 | 100 | 100 | 100 |
| Reaction temp. (°C.) | 400 | 400 | 350 | 400 | 300 | 400 |
| Reaction time (h) | 5 | 5 | 3 | 3.5 | 10 | 4 |
| Cooling temp. (°C.) | $-80$ | $-80$ | 20 | 20 | 20 | $-100$ |
| Product | | | | | | |
| Yield (g) | 52 | 67 | 52 | 56 | 47 | 42 |
| Yield (%) (to fluorine) | 93 | 96 | 96 | 90 | 94 | 88 |
| Fe Content (ppm) | 0.05 or less | 0.05 or less | 0.05 or less | 0.05 or less | 0.05 or less | 0.05 or less |

The above-mentioned "first" means first class grade chemical.
The above-mentioned "atm." means atmospheric pressure.

Comparative Example 3

In the bottom portion of a lateral reactor made from nickel and having a diameter of 25 mm and a length of 600 mm was placed 100 g of the same previously dried tungsten oxide powder as used in Example 16 as uniformly as possible, and the reactor was then heated up to about 100° C. Afterward, an $N_2$ gas was introduced into the reactor from the left end portion thereof at a flow rate of 300 Nml/minute for about 2 hours, followed by drying tungsten oxide.

After the stop of the introduction of the $N_2$ gas, an $F_2$ gas diluted with an $N_2$ gas was introduced into the reactor from the left end portion thereof under the same conditions as in Example 16, while the tungsten oxide layer was heated at a temperature of 380° to 400° C. as in Example 16, and a $WF_6$-containing gas generated in the reactor was then cooled to collect $WF_6$.

The yield amount of $WF_6$ was 22 g, and its yield ratio was 46% based on fluorine, which values were so low that they did not reach even the half levels of the values in Example 16. In addition, the content of Fe in $WF_6$ was 0.8 ppm, which was indicative that the product was not a little contaminated with the tungsten oxide powder.

Example 23

Tungsten oxide powder (iron content=50 ppm) of 99.9% purity which had been previously dried at 120° C. for 2 hours in an $N_2$ gas atmosphere was mixed sufficiently with NaF powder (first class grade chemical) which had been previously dried in like manner, in a weight ratio of 1:1, and the resulting mixture was then tableted under a tableting pressure of 2 $t/cm^2$ by the use of a small-sized tableting machine to obtain cylinder-shaped pieces each having a diameter of 5 mm and a height of 5 mm. Compressive strength of the molded pieces was extremely high, 265 $kg/cm^2$ in terms of an average value.

Next, a vertical reactor made of nickel and having an inner diameter of 25 mm and a height of 600 mm was filled in the central portion thereof with the molded pieces. Afterward, an $N_2$ gas having atmospheric pressure was introduced into the reactor from its underside at a flow rate of 300 Nml/minute for about 2 hours, while the filler layer of the molded pieces was heated at about 100° C. The flow rate of the $N_2$ gas was then lowered to 100 Nml/minute, and while the filler layer of the molded pieces was heated at a temperature of 380° to 400° C., an $NF_3$ gas having atmospheric pressure was introduced into the reactor at a flow rate of 70 Nml/minute, whereby reaction was performed for 2 hours. A $WF_6$-containing gas generated in the reactor was led into a refrigerant trap cooled to a temperature of −80° C., and the gas was liquefied and collected therein. After the completion of the reaction, the trap was evacuated by a vacuum pump to remove the $N_2$ gas used as a carrier gas, a secondarily formed $N_2$ gas and $O_2$ gas and the unreacted $NF_3$ gas.

The yield amount of $WF_6$ was 52 g, and its yield ratio was as high as 93% based on fluorine. In addition, the molded pieces in the reactor maintained the predetermined shape without breaking.

Since it was difficult to quantitatively analyze the content of tungsten oxide present in the collected $WF_6$, the content of iron (Fe) which was present in a relatively great amount as an impurity in tungsten oxide was instead measured by high-frequency induction combination plasma (ICP) analysis. As a result, it was apparent that the content of iron was 0.05 ppm or less. This result indicates that metal tungsten oxide which was the raw material was prevented from flying about.

Examples 24 to 30

The same procedure as in Example 23 was repeated with the exception that tungsten oxide as the metallic oxide was replaced with each metallic oxide shown in Table 5 and sodium fluoride as the molding auxiliary was replaced with each solid metal fluoride shown in Table 5 in each amount shown in Table 5, in order to obtain molded pieces in each amount shown in Table 5 (prior to the molding, each metallic oxide and molding auxiliary were dried as in Example 23).

The same reactor as used in Example 23 was filled with the molded pieces in each amount shown in Table 5, and the molded pieces were dried under the same conditions as in Example 23. Afterward, an $NF_3$ gas and carrier gas were introduced thereinto under reaction conditions shown in Table 5, and following the same procedure as in Example 23, a variety of gaseous metallic fluorides were prepared.

In this case, conditions of drying the molded pieces prior to the introduction of the $NF_3$ gas into the reactor were the very same as in Example 23.

Yield amounts, yield ratios and Fe contents of the thus obtained gaseous metallic fluoride products are set forth in Table 5. The yields of the respective examples were as high as in Example 23, and the metallic oxides did not fly about as in Example 23. Additionally, in all the examples, after the completion of the reaction, it was confirmed that the molded pieces did not break.

TABLE 5

|  | Example 24 | Example 25 | Example 26 | Example 27 | Example 28 | Example 29 |
|---|---|---|---|---|---|---|
| Metallic Oxide | | | | | | |
| Kind | $MoO_3$ | $TiO_2$ | $Ta_2O_5$ | $GeO_2$ | $Nb_2O_5$ | $Sb_2O_3$ |
| Purity (wt %) | 99.9 | 99.9 | 99.9 | 99.9 | 99.9 | 99.9 |
| Fe content (ppm) | 60 | 60 | 50 | 40 | 35 | 40 |
| Amount (g) | 50 | 40 | 60 | 50 | 40 | 60 |
| Molding Auxiliary | | | | | | |
| Kind | $CaF_2$ | $BaF_2$ | $AlF_2$ | NaF | $Na_3AlF_6$ | KF |
| Quality | first | first | first | first | first | first |
| Amount (g) | 50 | 60 | 40 | 50 | 60 | 40 |
| Molded Pieces | | | | | | |
| Tableting pressure ($t/cm^2$) | 2 | 2 | 3 | 2 | 3 | 2 |
| Compressive strength ($kg/cm^2$) | 250 | 230 | 260 | 250 | 270 | 210 |
| Yield (g) | 100 | 100 | 105 | 100 | 100 | 100 |
| Reaction Conditions | | | | | | |
| Carrier Gas | | | | | | |
| Kind | $N_2$ | $N_2$ | $N_2$ | $N_2$ | $N_2$ | $N_2$ |
| Flow rate (Nml/min.) | 100 | 100 | 100 | 100 | 100 | 100 |
| Pressure | atm. | atm. | atm. | atm. | atm. | atm. |
| $NF_3$ Gas | | | | | | |
| Flow rate (Nml/min.) | 50 | 50 | 70 | 60 | 50 | 50 |
| Pressure | atm. | atm. | atm. | atm. | atm. | atm. |
| Molded pieces (g) | 100 | 100 | 100 | 100 | 100 | 100 |

TABLE 5-continued

|  | Example 24 | Example 25 | Example 26 | Example 27 | Example 28 | Example 29 |
|---|---|---|---|---|---|---|
| Reaction temp. (°C.) | 350 | 450 | 400 | 300 | 450 | 480 |
| Reaction time (h) | 4 | 4 | 2 | 3 | 3 | 4 |
| Cooling temp. (°C.) | −80 | 20 | 20 | −100 | 20 | 20 |
| Product |  |  |  |  |  |  |
| Yield (g) | 54 | 47 | 59 | 104 | 42 | 65 |
| Yield (%) (to fluorine) | 96 | 95 | 95 | 97 | 93 | 94 |
| Fe Content (ppm) | 0.05 or less | 0.05 or less | 0.05 or less | 0.05 or less | 0.05 or less | 0.05 or less |

The above-mentioned "first" means first class grade chemical.
The above-mentioned "atm." means atmospheric pressure.

Comparative Example 4

In the bottom portion of a lateral reactor made of nickel and having a diameter of 25 mm and a length of 600 mm was placed 100 g of the same previously dried tungsten oxide powder as used in Example 23 as uniformly as possible, and the reactor was then heated up to about 100° C. Afterward, an $N_2$ gas having atmospheric pressure was introduced into the reactor from the left end portion thereof at a flow rate of 300 Nml/minute for about 2 hours, followed by drying tungsten oxide.

The flow rate of the $N_2$ gas was then lowered to 100 Nml/minute and an $NF_3$ gas having atmospheric pressure was introduced into the reactor from the left end portion thereof at a flow rate of 70 Nml/minute under the same conditions as in Example 23, while the tungsten oxide layer was heated at a temperature of 380° to 400° C., whereby reaction was performed for 4 hours. Afterward, a $WF_6$-containing gas generated in the reactor was cooled to collect $WF_6$ in the same manner as in Example 23.

The yield amount of $WF_6$ was 48 g, and its yield ratio was 43% based on fluorine, which values were so low that they did not reach even the half levels of the values in Example 23. In addition, the content of Fe in $WF_6$ was 1.0 ppm, which was indicative that the product was not a little contaminated with the tungsten oxide powder.

Example 30

First, 1.5 kg of metallic tungsten powder of 99.9% purity was mixed sufficiently with 1.5 kg of NaF powder (first class grade chemical), and the resulting mixture was then tableted under a tableting pressure of 2 t/cm² by the use of a small-sized tableting machine to obtain 3 kg of cylinder-shaped pieces each having a diameter of 15 mm and a height of 5 mm. Compressive strength of the molded pieces was extremely high, 270 kg/cm² in terms of an average value.

Next, a vertical reactor made of nickel and having an inner diameter of 75 mm and a height of 1,000 mm was filled in the central portion thereof with the molded pieces. Afterward, an $N_2$ gas (diluent gas) and $H_2$ gas (reducing gas) having atmospheric pressure were both introduced into the reactor from its underside at a flow rate of 300 Nml/minute for about 10 hours, while the filler layer of the molded pieces was heated at about 700° C., whereby the molded pieces were thermally treated. Next, the $H_2$ gas in the reactor was perfectly replaced with the $N_2$ gas.

Afterward, the flow rate of the $N_2$ gas was lowered to 100 Nml/minute, and while the filler layer of the molded pieces was heated at a temperature of 380° to 400° C., an $NF_3$ gas having atmospheric pressure was introduced into the reactor at a flow rate of 100 Nml/minute, whereby reaction was performed for 50 hours. A $WF_6$-containing gas generated in the reactor was led into a collector vessel cooled to a temperature of −80° C., so that the gas was liquefied and collected therein. After the completion of the reaction, the collector vessel was evacuated by a vacuum pump to remove the $N_2$ gas used as a carrier gas, a secondarily formed $N_2$ gas and the unreacted $NF_3$ gas. The yield amount of $WF_6$ was 1,960 g, and its yield ratio was as high as 98% based on the $NF_3$ gas.

Furthermore, $WF_6$ was removed from the collector vessel by distillation at a little higher temperature than the boiling point of $WF_6$, and the interior of the collector vessel was then observed. However, it was confirmed that neither the white solid nor metallic tungsten were present therein.

Examples 31 to 37

The same procedure as in Example 30 was repeated with the exception that metallic tungsten was replaced with each simple metal shown in Table 6, and NaF as the molding auxiliary was replaced with each solid metallic fluoride shown in Table 6 in each amount shown in Table 6 by the use of each tableting pressure shown in Table 6, in order to obtain molded pieces.

The same reactor as used in Example 30 was filled with the molded pieces, and a reducing gas and dilute gas shown in Table 6 were introduced into the reactor under reaction conditions shown in Table 6 as in Example 30 to thermally treat the molded pieces.

Afterward, an $F_2$ gas or $NF_3$ gas and a carrier gas were introduced into the reactor under reaction conditions shown in Table 6, and following the same procedure as in Example 30, a variety of gaseous metallic fluorides were prepared.

In this case, yield amounts and yield ratios of the thus obtained gaseous metallic fluoride products are set forth in Table 6, and the yields in the respective examples were as high as in Example 30. Additionally, in the same manner as in Example 30, it was inspected whether or not the simple metal and a white solid were present in the collected gaseous metallic fluorides. As a result, their presence was not confirmed.

TABLE 6

|  | Example 31 | Example 32 | Example 33 | Example 34 | Example 35 | Example 36 | Example 37 |
|---|---|---|---|---|---|---|---|
| Metal | | | | | | | |
| Kind | molyb. | niobium | antimo. | arsenic | titan. | tantal. | germa. |
| Purity (wt %) | 99.9 | 99.9 | 99.9 | 99.9 | 99.9 | 99.9 | 99.9 |
| Amount (kg) | 1.5 | 1.5 | 1.5 | 1.5 | 0.75 | 1.5 | 1.5 |
| Molding Auxiliary | | | | | | | |
| Kind | $CaF_2$ | KF | $MgF_2$ | $AlF_3$ | NaF | $Na_3AlF_6$ | $BaF_2$ |
| Quality | first | first | first | first | first | first | first |
| Amount (kg) | 1.5 | 1.5 | 1.5 | 1.5 | 2.25 | 1.5 | 1.5 |
| Molded Pieces | | | | | | | |
| Tableting pressure (t/cm$^2$) | 3 | 2 | 3 | 2 | 3 | 2 | 3 |
| Compressive strength (kg/cm$^2$) | 280 | 210 | 260 | 230 | 250 | 200 | 270 |
| Heating Conditions | | | | | | | |
| Diluent gas | $N_2$ | $N_2$ | $N_2$ | $N_2$ | $N_2$ | $N_2$ | $N_2$ |
| Reducing gas | CO | $H_2$ | $NH_3$ | $H_2$ | CO | $H_2$ | $NH_3$ |
| Conc. of reducing gas (%) | 40 | 30 | 50 | 40 | 30 | 50 | 40 |
| Flow rate of gas (Nl/min.) | 2 | 2 | 2 | 2 | 2 | 2 | 2 |
| Gas pressure in atmosphere | atm. | atm. | atm. | atm. | atm. | atm. | atm. |
| Heating temp. (°C.) | 700 | 650 | 750 | 700 | 700 | 650 | 750 |
| Heating time (h) | 32 | 48 | 24 | 32 | 32 | 48 | 24 |
| Reaction Conditions | | | | | | | |
| Diluent gas | $N_2$ | He | He | $N_2$ | $N_2$ | He | He |
| Reaction gas | $NF_3$ | $NF_3$ | $NF_3$ | $F_2$ | $F_2$ | $F_2$ | $F_2$ |
| Conc. of reaction gas | 50 | 40 | 40 | 20 | 20 | 25 | 25 |
| Flow rate (Nml/min.) | 200 | 250 | 250 | 400 | 400 | 320 | 320 |
| Pressure | atm. | atm. | atm. | atm. | atm. | atm. | atm. |
| Reaction temp. (°C.) | 400 | 500 | 400 | 400 | 450 | 400 | 400 |
| Reaction time (h) | 93 | 80 | 62 | 112 | 117 | 78 | 155 |
| Collection temp. (°C.) | −75 | 20 | −75 | −75 | 20 | 25 | −100 |
| Product | | | | | | | |
| Yield (g) | 2511 | 2345 | 2052 | 2070 | 1477 | 1691 | 2369 |
| Yield (%) | 96 | 97 | 95 | 98 | 95 | 97 | 96 |

In the foregoing, "molyb.", "antimo.", "titan.", "tantal.", "germa." and "first" mean molybdenum, antimony, titanium, tantalum, germanium and first class grade chemical, respectively.
The above-mentioned "atm." means atmospheric pressure, and the yield (%) of the product is based on the $F_2$ gas or $NF_3$ gas.

Comparative Example 5

The reactor used in Example 30 was filled with 3 kg of the molded pieces obtained in the same manner as in Example 30, and while the filler layer of the molded pieces was heated at a temperature of 700° C., an $N_2$ gas as an inert gas having atmospheric pressure was then introduced into the reactor at a flow rate of 300 Nml/minute until the water content in the gas at an outlet of the reactor had reached 5 ppm, whereby the water in the molded pieces was removed therefrom.

Next, an $NF_3$ gas and $N_2$ gas were introduced into the reactor under the same conditions as in Example 30, in order to prepare $WF_6$.

However, 30 hours after the introduction of these gases had been commenced, the pressure in the reactor rose, and the amount of the gas coming from the outlet of the reactor decreased extremely, so that it became impossible to successively feed the $NF_3$ gas and $N_2$ gas. At this pont of time, therefore, the reaction was brought to an end.

After the stop of the reaction, this cause was inspected. As a result, it was found that a pipe disposed between the outlet of the reactor and a collector vessel was clogged with a white solid. In addition, the thus collected $WF_6$ was distilled off as in Example 30, and the interior of the collector vessel was observed, and the presence of the white solid was confirmed.

What is claimed is:

1. A method for preparing a gaseous metallic fluoride by reacting a metal or its oxide wit fluorine gas or nitrogen trifluoride gas, the process comprising the steps of mixing said metal or its oxide with a molding auxiliary compound comprising at least one compound selected from the group consisting of lithium fluoride, sodium fluoride, potassium fluoride, rubidium fluoride, cesium fluoride, beryllium fluoride, magnesium fluoride, calcium fluoride, strontium fluoride, barium fluoride, aluminum fluoride, gallium fluoride, indium fluoride and aluminum sodium fluoride; molding the resulting mixture under pressure to form molded pieces; and contacting the molded pieces with said fluorine gas or nitrogen trifluoride gas while said molded pieces are heated to form said gaseous metallic fluoride.

2. A method for preparing a gaseous metallic fluoride according to claim 1 wherein said gaseous metallic fluoride is at least one compound selected from the group consisting of tungsten hexafluoride ($WF_6$), molybdenum hexafluoride ($MoF_6$), antimony trifluoride ($SbF_3$), antimony pentafluoride.

3. A method for preparing a gaseous metallic fluoride according to claim 1 wherein said metal is at least one selected from metals in the groups IIIA, IIIB, IVA, IVB, VA, VB, VIA and VIB of the periodic table.

4. A method for preparing a gaseous metallic fluoride according to claim 3 wherein said metal is at least one selected from the group consisting of tungsten (W), molybdenum (Mo), antimony (Sb), niobium (Nb), arsenic (As), phosphorus (P), boron (B), tantalum (Ta), titanium (Ti), silicon (Si), germanium (Ge), sulfur (S) and uranium (U).

5. A method for preparing a gaseous metallic fluoride according to claim 1 wherein said metal oxide is at least one selected from the group consisting of tungsten oxide ($WO_3$), molybdenum oxide ($MoO_3$), uranium oxide (UO, $UO_2$ and $U_3O_8$), arsenic oxide ($As_2O_5$), antimony oxide ($Sb_2O_5$), niobium oxide ($Nb_2O_5$), tantalum oxide ($Ta_2O_5$), titanium oxide ($TiO_2$) and germanium oxide ($GeO_2$).

6. A method for preparing a gaseous metallic fluoride according to claim 1 wherein the amount of said metal or its oxide in the mixture is in the range of 30 to 70% by weight based on said mixture of said metal or its oxide and said molding auxiliary compound.

7. A method for preparing a gaseous metallic fluoride according to claim 1 wherein said mixture of said metal or its oxide and said molding auxiliary compound is molded under a pressure of 0.5 to 10 t/cm$^2$.

8. A method for preparing a gaseous metallic fluoride according to claim 1 wherein said molded pieces have a shape of a cylinder, ring, cubic sphere, gear wheel shape or ribbed shape.

9. A method for preparing a gaseous metallic fluoride according to claim 1 wherein said reaction of said molded pieces with said fluorine gas or nitrogen trifluoride is performed at a temperature of 150° to 700° C.

10. A method for preparing a gaseous metallic fluoride according to claim 1 wherein said reaction of said molded pieces with said fluorine gas or nitrogen trifluoride is performed under a pressure of 1 to 10 kg/cm$^2$.

11. A method for preparing a gaseous metallic fluoride according to claim 1 wherein said reaction of said molded pieces with said fluorine gas or nitrogen trifluoride is performed for a period of 1 to 20 hours.

12. A method for preparing a gaseous metallic fluoride according to claim 1 wherein when the molded pieces are brought into contact with said fluorine gas or nitrogen trifluoride gas, said molded pieces are present in the form of filler layer.

13. A method for preparing a gaseous metallic fluoride according to claim 1 wherein said heating treatment in said reducing gas atmosphere is performed for a period of 1 to 100 hours in the case that the raw material is said metal, or for a period of 2 to 500 hours in the case that the raw material is said metallic oxide.

14. A method for preparing a gaseous metallic fluoride according to claim 1 wherein before contacting the molded pieces with said fluoride gas or nitrogen trifluoride gas, said molded pieces are heated in a reducing gas at a temperature of 500° to 850° C. and then brought into contact with said fluorine gas or nitrogen trifluoride gas under heating.

15. A method of preparing a gaseous metallic fluoride comprising the steps of compacting a mixture of a metal or metal oxide with a solid metal fluoride under pressure to form a molded piece, wherein the metal fluoride is selected from the group consisting of lithium fluoride, sodium fluoride, potassium fluoride, rubidium fluoride, cesium fluoride, beryllium fluoride, magnesium fluoride, calcium fluoride, strontium fluoride, barium fluoride, aluminum fluoride, gallium fluoride, indium fluoride, and aluminum sodium fluoride; heating the molded piece in an atmosphere containing fluorine gas or nitrogen trifluoride gas at a temperature and for sufficient time to produce a substantially pure metallic fluoride.

16. The method of claim 15 wherein said metal or metal oxide is selected from the group consisting of group IIIA, IIIB, IVA, IVB, VA, VB, VIA, and VIB metals.

17. The method of claim 16 wherein said metallic fluoride is represented by $MF_m$ wherein M is a metal and m is an integer from 3 to 6.

18. A method of preparing a gaseous metallic fluoride comprising the steps of;

(a) compacting a mixture of a solid metallic fluoride and a metal or metal oxide under pressure to form a molded piece, wherein said solid metallic fluoride is selected from the group consisting of lithium fluoride, sodium fluoride, potassium fluoride, rubidium fluoride, cesium fluoride, beryllium fluoride, magnesium fluoride, calcium fluoride, strontium fluoride, barium fluoride, aluminum fluoride, gallium fluoride, indium fluoride, thallium fluoride and aluminum sodium fluoride, and wherein the metal or metal oxide is a metal selected from the group consisting of groups IIIA, IIIB, IVA, IVB, VA, VB, VIA and VIB;

(b) heating the molded piece in a reducing gas atmosphere;

(c) heating the molded pieces in an atmosphere containing fluorine gas or nitrogen trifluoride gas at a temperature and for sufficient time whereby substantially pure metallic fluoride gas is produced.

* * * * *